(12) United States Patent
Plata

(10) Patent No.: US 12,188,582 B2
(45) Date of Patent: Jan. 7, 2025

(54) TUBULAR IRRIGATION DEVICE AND METHOD OF MAKING THE SAME

(71) Applicant: Silverpack, LLC, Clarksdale, MS (US)

(72) Inventor: Carlos Plata, Barranquilla (CO)

(73) Assignee: Silverpack, LLC, Clarksdale, MS (US)

( * ) Notice: Subject to any disclaimer, the term of this patent is extended or adjusted under 35 U.S.C. 154(b) by 219 days.

(21) Appl. No.: 17/765,959

(22) PCT Filed: Oct. 1, 2020

(86) PCT No.: PCT/US2020/053712
§ 371 (c)(1),
(2) Date: Apr. 1, 2022

(87) PCT Pub. No.: WO2021/071730
PCT Pub. Date: Apr. 15, 2021

(65) Prior Publication Data
US 2022/0307628 A1    Sep. 29, 2022

Related U.S. Application Data (60) Provisional application No. 62/913,300, filed on Oct. 10, 2019.

(51) Int. Cl.
*F16L 11/08* (2006.01)
*B29C 48/00* (2019.01)
(Continued)

(52) U.S. Cl.
CPC ........ *F16L 11/085* (2013.01); *B29C 48/0021* (2019.02); *B29C 48/09* (2019.02); *B29C 48/21* (2019.02); *B29D 23/001* (2013.01); *B32B 1/08* (2013.01); *B32B 5/024* (2013.01); *B32B 5/24* (2013.01); *B32B 27/32* (2013.01); *B29K 2023/083* (2013.01); *B29K 2623/06* (2013.01); *B29K 2623/12* (2013.01);
(Continued)

(58) Field of Classification Search
CPC ... F16L 11/00; F16L 9/12; F16L 9/121; Y10T 428/139; Y10T 428/1393
USPC .......................................... 138/137, 140, 141
See application file for complete search history.

(56) References Cited

U.S. PATENT DOCUMENTS 4,014,370 A * 3/1977 McNulty .................... F16L 9/14
138/144
5,660,660 A * 8/1997 Greuel, Jr. .......... H02G 15/1813
156/244.26
(Continued)

FOREIGN PATENT DOCUMENTS

KR        101755259 B1      7/2017

OTHER PUBLICATIONS

International Search Report for PCT Patent Application No. PCT/US2020/053712, mailed Oct. 1, 2020, 3 pages.
(Continued)

*Primary Examiner* — Patrick F Brinson
(74) *Attorney, Agent, or Firm* — Jordan IP Law, LLC (57) ABSTRACT

A tubular irrigation device, such as a pipe or sleeve, having a circular multilayer polymeric structure including one or more layers of woven polymeric thermoplastic materials, one or more layers of thermoplastic polymeric materials, and one or more layers of polymeric waterproofing materials in film form. Methods of making the tubular irrigation device are also described.

12 Claims, 5 Drawing Sheets

(51) Int. Cl.
*B29C 48/09* (2019.01)
*B29C 48/21* (2019.01)
*B29D 23/00* (2006.01)
*B32B 1/08* (2006.01)
*B32B 5/02* (2006.01)
*B32B 5/24* (2006.01)
*B32B 27/32* (2006.01)
*B29K 23/00* (2006.01)
*B29K 623/00* (2006.01)
*B29L 23/00* (2006.01)
*B32B 7/12* (2006.01)
*F16L 11/04* (2006.01)

(52) U.S. Cl.
CPC ....... *B29K 2713/00* (2013.01); *B29L 2023/22* (2013.01); *B32B 7/12* (2013.01); *B32B 2262/0253* (2013.01); *B32B 2597/00* (2013.01); *F16L 2011/047* (2013.01)

(56) References Cited

U.S. PATENT DOCUMENTS

| | | | |
|---|---|---|---|
| 7,048,010 B2* | 5/2006 | Golan | A01G 25/02 138/119 |
| 11,441,706 B2 | 9/2022 | Mitchell | |
| 2002/0033196 A1* | 3/2002 | Jeong | B29D 23/001 138/123 |
| 2007/0074776 A1* | 4/2007 | Masarwa | F16L 9/17 138/124 |
| 2007/0292647 A1 | 12/2007 | Princell | |
| 2008/0145579 A1* | 6/2008 | Nguyen | B32B 1/08 428/36.1 |
| 2008/0277013 A1 | 11/2008 | Anders | |

OTHER PUBLICATIONS

International Search Report and Written Opinion for WIPO Patent Application No. PCT/US2020/053712, mailed Feb. 1, 2021, 8 pages.

* cited by examiner

TUBULAR IRRIGATION DEVICE AND METHOD OF MAKING THE SAME

CROSS REFERENCE TO RELATED APPLICATIONS

This application claims benefit of and priority to International Patent Application No. PCT/US2020/053712 filed Oct. 1, 2020, which claims benefit of and priority to U.S. Provisional Patent Application No. 62/913,300, filed Oct. 10, 2019, the contents of which are incorporated herein by reference in its entirety.

TECHNICAL FIELD

The present disclosure relates to tubular irrigation devices such as irrigation pipes, tubes or sleeves methods of making the same. The tubular irrigation devices of the present disclosure provide for the irrigation of extensive crops. The tubular irrigation device disclosed herein may be formed by a multilayer polymeric sheet whose configuration mitigates the deterioration of the tubular irrigation device under the exposure to high pressures and outdoor weather, allowing for extended lifetime use thereof and improvement of the installation efficiency of the tubular irrigation devices.

BACKGROUND

Various irrigation mechanisms have been used for the irrigation of extensive crops. One of the most commonly used methods is to pump water through a network of flexibles plastic pipes that will have man made holes or outlets through which the water will exit and then flow with gravity and according to the grade of the field in order to irrigate the full farm. The plastic pipe allows for water to be transported to the desired locations without suffering losses by filtration and evaporation and avoiding the need of dredging specialize channels.

Commonly, water conduction devices vary from rigid pipes to flexible sleeves. The use of rigid pipes implies laborious installations, large storage spaces and the need for additional accessories to the pipe itself. On the other hand, flexible sleeves or pipes allow for the conduction of large volumes of water with a simplified assembly, but with a short life span.

Flexible sleeves made from polyethylene have a low resistance to tearing and punching, which implies additional care, such as cleaning the terrain from sticks, thorns, stones and wires for their installation, avoiding dragging them, keep weeds and rodents away from the facilities, and, on a temporary basis, ensuring low pressure throughout the system due to its low resistance to internal pressure. Even with the aforementioned care, flexible polyethylene sleeves must be replaced frequently because they burst and blow out when exposed to high water pressures due to rolling landscapes and deteriorate under the environmental conditions of the land and handling.

This type of irrigation application has been known to be conducted with a plastic flexible pipe, such as a blown film tubular pipe made of 100% polyethylene. However, such a blown film structure is naturally weak mechanically, lacks capacity to support high water pressures that build up when water is required to be transported through uneven landscape or long distances, therefore bursting and flooding the farmlands chaotically. In order to overcome this low resistance to water pressure issue, the blown film is made of thick walls, making the tubular flexible roll heavy and hard to handle, transport and install. An additional drawback to this blown film pipe is its affinity to tear due to animal bites or sticks, thorns and stones in the ground causing the farmer to constantly patch the punctures to avoid water to leak.

In order to improve the mechanical properties, there are flexible polyethylene sleeves on the market with different wall thicknesses. Those with a greater wall thickness achieve a greater resistance to tearing and puncture. However, because of wall thickness, a flexible polyethylene sleeve with greater weight per unit area is obtained, which has the drawback of the length of sleeve that can be packed in a roll of the same diameter. That is, to cover a crop extension with a flexible polyethylene hose whose wall thickness is sufficient to prolong its lifetime of usefulness, a greater number of rolls of the flexible sleeve are necessary, therefore downtime and installation costs are higher.

Thus, there is a need for improvements to irrigation mechanisms used for the irrigation of extensive crops.

BRIEF SUMMARY OF THE DISCLOSURE

The present disclosure relates to a tubular irrigation device, such as a pipe or sleeve, that allows for the supply of water to extensive crops by irrigation by pressure to subsequently flood the furrows by gravity. The device disclosed herein avoids the need to frequently replace the sleeves used for irrigation of extensive crops due to its superior tear resistance that translate to higher water pressure resistance. Furthermore, it allows a roll of the same diameter to contain more linear quantity of the tubular device to reduce the number of rolls needed in installation. For this reason, the tubular device of the present application decreases costs and downtime related to the mounting of each roll to the installation system.

The tubular irrigation device disclosed herein is preferably formed by a circular multilayer polymeric structure whose configuration mitigates the deterioration of the tubular device, extends its lifetime of use and improves the pipe installation process.

The tubular irrigation device according to the present disclosure comprises a circular multilayer polymeric structure having one or more layers of woven polymeric thermoplastic materials, one or more layers of thermoplastic polymeric materials and one or more layers of polymeric waterproofing materials in film form.

In an embodiment the device disclosed herein is a tubular irrigation device, such as a sleeve or pipe, includes one or more layers of thermoplastic polymeric woven materials which are found in the outermost part of tubular device; one or more layers of thermoplastic polymeric materials which are found in the middle of the multilayer polymer film; and one or more layers of polymeric waterproofing materials which are found in the innermost part of the tubular device.

In an embodiment the device disclosed herein is a tubular irrigation device, such as a sleeve or pipe, comprising a circular multilayer polymeric structure, wherein the polymeric structure comprises an outer layer and an inner layer; the outer layer comprises one or more layers of a woven polymeric thermoplastic material selected from polypropylene and polyethylene; and the inner layer comprises a multilayer polymeric thermoplastic film having an adhesive layer and a waterproof layer.

In an embodiment the device disclosed herein is a tubular irrigation device, such as a sleeve, tube, or pipe, wherein the waterproof layer is selected from a polypropylene or polyethylene film.

In an embodiment the device disclosed herein is a tubular irrigation device, such as a sleeve, tube, or pipe, wherein the adhesive layer comprises one or more layers of a thermoplastic polymeric material selected from a multilayer extruded film of polyethylene (e.g., LDPE, HDPE, LLDPE) and EVA resin, an extruded copolymer blend of polyethylene and polypropylene, and an extruded polyethylene polymer blend.

In an embodiment the device disclosed herein is a tubular irrigation device, such as a sleeve, tube, or pipe, wherein the one or more layers of woven polymeric thermoplastic materials are the outermost layer of the tubular device; the one or more waterproof layers of the polymeric thermoplastic film are the innermost layer of the tubular device; and the adhesive layer of thermoplastic polymeric film is between the woven polymeric thermoplastic material and the waterproof thermoplastic layer of the polymeric film and adheres the inner multilayer thermoplastic film to the outer woven polymeric layer.

In an embodiment the device disclosed herein is a tubular irrigation device, such as a sleeve, tube, or pipe, wherein the adhesive layer comprises a multilayer extruded film of polyethylene and EVA resin.

In an embodiment the device disclosed herein is a tubular irrigation device, such as a sleeve, tube, or pipe, wherein the adhesive layer comprises a copolymer blend of polyethylene and polypropylene.

The tubular irrigation device disclosed herein is a tubular irrigation device, such as a sleeve, tube, or pipe, wherein the adhesive layer comprises an extruded polyethylene polymer.

The tubular irrigation device of claim 1, wherein the adhesive layer comprises an extruded polyethylene polymer.

In an embodiment the device disclosed herein is a tubular irrigation device, such as a sleeve, tube, or pipe, wherein the one or more layers of woven polymeric thermoplastic materials have a basis weight of from 50 to 200 g/m$^2$.

In an embodiment the device disclosed herein is a tubular irrigation device, such as a sleeve, tube, or pipe, wherein the one or more layers of thermoplastic polymeric materials have a basis weight of from 15 to 35 g/m$^2$.

In an embodiment the device disclosed herein is a tubular irrigation device, such as a sleeve, tube, or pipe, wherein the one or more layers of polymeric waterproofing materials have a basis weight from 25 to 70 g/m$^2$.

In an embodiment the device disclosed herein is a tubular irrigation device, such as a sleeve, tube, or pipe, wherein the one or more layers of woven polymeric thermoplastic materials have a basis weight of 50-200 g/m$^2$; the one or more layers of thermoplastic polymeric materials have a basis weight of 15 to 35 g/m$^2$ and the one or more layers of polymeric waterproofing materials have a basis weight of 25 to 70 g/m$^2$.

In an embodiment the device disclosed herein is a tubular irrigation device, such as a sleeve, tube, or pipe, wherein the tubular body has a diameter of from 5 inches to 50 inches.

In an embodiment the device disclosed herein is a tubular irrigation device, such as a sleeve or pipe, wherein the device further contains an ultraviolet (UV) radiation protection additive.

In an embodiment the device disclosed herein is a tubular irrigation device, such as a sleeve, tube, or pipe, wherein the tubular irrigation device has a 100% waterproof property along its entire length.

Another embodiment disclosed herein is a method for making a tubular irrigation device comprising: obtaining flat film bobbins one or more than one polymeric layers in a blown film polyethylene co-extrusion line or flat film polypropylene co-extrusion line; weaving polyethylene or polypropylene circular fabric using a tapeline extruder and circular looms; coating the flat film bobbins onto the outside of the circular fabric in an extrusion coating machine to adhere the flat film to the circular fabric; unwinding the roll produced from the extrusion coating machine to the predetermined length; and inverting in an inversion machine to position the flat film as the inner layer.

Another embodiment disclosed herein is a process for making a tubular irrigation device comprising: extruding a multilayer circular film with one layer comprising 100% EVA resin and the other layer comprising a polyethylene blend; inserting said multilayer circular film loosely in a circular fabric made of polyethylene or polypropylene extruded tapes and applying heat to bond the multilayer circular film to the circular fabric.

In another embodiment, the device disclosed herein is a tubular irrigation device, such as a sleeve, tube, or pipe, made by obtaining flat film bobbins one or more than one polymeric layers in a blown film polyethylene co-extrusion line or flat film polypropylene co-extrusion line; weaving polyethylene or polypropylene circular fabric using a tapeline extruder and circular looms; coating the flat film bobbins onto the outside of the circular fabric to adhere the flat film to the circular fabric in an extrusion coating machine; unwinding the roll produced from the extrusion coating machine to the predetermined length; and inverting in an inversion machine to position the flat film as the inner layer.

In another embodiment, the device disclosed herein is a tubular irrigation device, such as a sleeve, tube, or a pipe, made by extruding a multilayer circular film with one layer comprising 100% EVA resin and the other layer comprising a polyethylene blend; inserting said multilayer circular film loosely in a circular fabric made of polyethylene or polypropylene extruded tapes and applying heat to bond the multilayer circular film to the circular fabric.

BRIEF DESCRIPTION OF THE DRAWINGS

Exemplary embodiments are illustrated in the referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures.

DETAILED DESCRIPTION

The present disclosure relates to tubular irrigation devices designed to be installable in extensive crops that can support higher water pressure rates to enable a long lifetime of usefulness and that allows the process of installation of the irrigation system to be more efficient. The aforementioned characteristics would save tremendous time and money to the farmer since a stronger flexible pipe would allow farmers to irrigate difficult (uneven) areas with more success and efficiency, lay new pipe more quickly, and avoid having to re-lay pipe due to deterioration before end of the season.

Tubular irrigation devices of the present disclosure allow water to be supplied to extensive crops by pressure from wells with underground pumps and further irrigate the furrows by gravity flooding. The tubular irrigation device of the present disclosure avoids the need to frequently replace the sleeves used for irrigation of extensive crops and that allows a roll of the same diameter to contain more linear amount of the tubular device.

The tubular device disclosed herein is one formed by a multilayer polymeric sheet whose configuration mitigates the deterioration of the tubular device, extends its lifetime of use and improves the pipe installation process. The number of rolls required for installation and the number of joints required in the field are reduced due to the characteristics of the tubular irrigation device disclosed herein.

The tubular irrigation device according to the present disclosure has a tear strength and puncture strength such that the lifespan is extended. Preferably, the multilayer polymeric sheet of the tubular irrigation device disclosed herein comprises one or more layers of woven polymeric thermoplastic materials, one or more layers of thermoplastic polymeric materials, e.g., an adhesive thermoplastic polymeric material, and one or more layers of polymeric waterproofing materials.

Illustrative types of thermoplastic polymer resins that can be used for the one or more layers of woven polymeric thermoplastic materials include, but are not limited to, polypropylene (PP), polyethylene (PE) such as for example LDPE, HDPE, LLDPE, polyethylene terephthalate (PET), polyamide (PA) such as nylon, and blends thereof. More preferably, thermoplastic polymer resins that can be used for the one or more layers of woven polymeric thermoplastic materials include, but are not limited to, polypropylene or polyethylene.

The one or more layers of polymeric waterproofing materials for the waterproof layer may include, but are not limited to, polypropylene, polyethylene (e.g., LDPE, HDPE, LLDPE), polyethylene terephthalate (PET), polyvinylchloride (PVC), and polystyrene.

The one or more layers of thermoplastic materials for the adhesive layer may include, but are not limited to polyethylene (e.g., LDPE, HDPE, LLDPE), polypropylene, ethylene vinyl acetate (EVA), copolymers, blends, mixtures, and combinations thereof.

Figure 1:
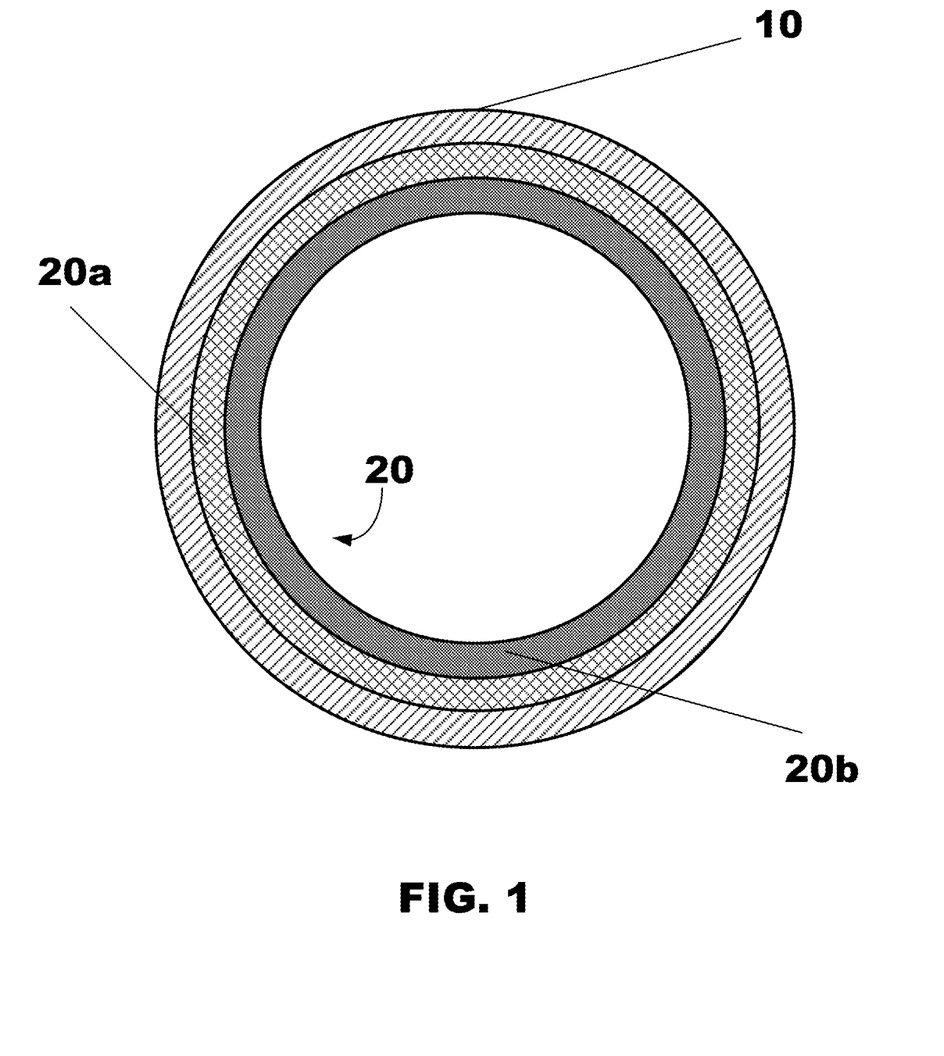
FIG. 1 schematically shows a front sectional view of an embodiment of the tubular irrigation device according to the present disclosure.

In one embodiment, the tubular irrigation device, such as a sleeve or pipe, of the present disclosure as shown for example in FIG. 1, comprises one or more layers of woven polymeric thermoplastic materials as the outermost layer (10) of the tubular device; and one or more inner layers of thermoplastic polymeric materials which may be a multilayer polymeric film (20); wherein the multilayer polymeric film (20) comprises an inner layer (20b) which comprises one or more layers of a polymeric waterproof material in the innermost part of the tubular device and a thermoplastic layer (20a) provided on said polymeric waterproof material which serves as an adhesive between the inner layer (20b) and the outermost layer (10).

The one or more layers of woven thermoplastic materials comprise at least one material that is selected from polypropylene or polyethylene, where both possible materials are in their woven polymeric configuration and provide mechanical strength to the device. Woven fabric is formed on looms and are made to be sturdy, durable and permit limited stretching. The tubular irrigation device herein disclosed comprises of a tubular woven fabric, assuring no weak points due to the absence of welded seam or connection. The tubular woven polymeric fabric has been engineered to always be the outer layer of the irrigation device, acting as a flexible shell that protects the inner layers (against tear and stretching due to water pressure) which play an essential role of transporting the water without leakage.

The one or more layers of thermoplastic polymeric materials of this device comprise at least one material comprising a copolymer of polypropylene and polyethylene. Preferably, the one or more layers of thermoplastic polymeric materials of this device comprises a copolymer (blend) of polypropylene and polyethylene applied through extrusion coating, and the other layer comprises one or more types of polyethylene (e.g., LDPE, HDPE, LLDPE). The polymeric layer comprising a copolymer (blend) of polypropylene and polyethylene serves as an adhesive between the inner layer and the outer layer.

The one or more layers of polymeric waterproofing materials that are part of the device disclosed herein, comprises mechanically oriented thermoplastic materials. Preferably, the one or more layers of polymeric waterproofing materials comprise at least one material that is selected from polypropylene coextruded film and a polyethylene coextruded film, so that the present tubular device is impermeable to water or other similar fluids. The one or more layers of polymeric waterproofing materials allow water to be driven or conducted to the desired locations of the crop without loss by filtration into the ground or into the atmosphere by evaporation.

In an embodiment, the tubular irrigation device according to the present disclosure comprises an outer layer of circular woven polymeric thermoplastic materials (e.g., polypropylene or polyethylene), a middle layer made of a blend of thermoplastic polymeric materials also referred to as a "coating" or an extruded polymer of polyethylene which plays the role of adherence between the layers and an inner layer or film made of one or more layers of polymeric materials to make the irrigation device a 100% waterproof.

In another embodiment, the tubular irrigation device according to the present disclosure comprises an outer layer of a circular woven polymeric thermoplastic fabric material (e.g., polypropylene or polyethylene), an inner layer which comprises a circular film, which is made of two or more layers of polymeric materials, wherein one of said polymeric layers comprises a copolymer (blend) of polypropylene and polyethylene applied through extrusion coating, and the other layer comprises one or more types of polyethylene. The polymeric layer comprising a copolymer (blend) of polypropylene and polyethylene serves as an adhesive between the inner layer and the outer layer.

In another embodiment, the tubular irrigation device according to the present disclosure comprises an outer layer of a circular woven polymeric thermoplastic fabric material (polypropylene or polyethylene), an inner layer which comprises a circular film, which may be made of two or more layers of polymeric materials, wherein at least one layer comprises an EVA resin and at least one other layer comprises one or more types of polyethylene. The EVA resin adheres to the woven polymeric thermoplastic fabric through hot air techniques.

In another embodiment, the tubular irrigation device according to the present disclosure comprises an outer layer of a circular woven polymeric thermoplastic material (e.g., polypropylene or polyethylene), an inner layer which comprises a flat film, which is made of two or more layers of polymeric materials, wherein one layer comprises an extruded polyethylene layer or extruded copolymer layer (blend of polypropylene and polyethylene) and the other layer comprises of a film made by mono-extruding or co-extruding polyethylene or polypropylene.

Additionally, in order to protect the irrigation pipe from the sun, a UV (ultraviolet) additive may be added in an amount of about 2-3% of the masterbatch when blending the different extrusion process raw materials.

The tubular irrigation device disclosed herein can be manufactured in a variety of different diameters, from 6 inches to 50 inches.

The tubular irrigation device disclosed herein can be manufactured in rolls of any length. Although due to farming practices and standards predetermined roll lengths are 200, 400, 800, 1200, or 1600 meters long.

Manufacturing Process I—Circular Inner Film Bonded to Circular External Fabric

In one embodiment, the tubular irrigation device of the present disclosure can be manufactured by adhering two main layers: (1) Circular Polypropylene fabric; and (2) Circular Polyethylene film.

Blown Film Process: In an embodiment, circular polyethylene film is obtained through a blown film plastic co-extrusion process that comprises two screws in order to make two layers such as in a blown film co-extrusion line. The inner layer may be made by mixing high density polyethylene at 70% and linear low-density polyethylene at 30%. The outer layer may be made out of EVA at 100%. The grams per square meter of the circular polyethylene film can be between 25 and 75 gsm; the inner layer (HDPE+LDPE) accounts for 70% of the total weight per square meter and the outer thermoplastic layer (EVA) accounts for 30%. The circular polyethylene film is preferably made from at least two layers wherein the EVA in the outer thermoplastic layer melts at low temperatures, such that upon heating it provokes adherence with the woven plastic, such as woven polypropylene or polyethylene. In this process, care is taken to assure no pinholes are made to the film in order to adjust its width. If a pinhole happens to exist, that film bobbin should be put aside as scrap.

Woven Fabric Process: In an embodiment, the production of the woven polypropylene fabric is done in a two-stage process. Firstly, a raffia extrusion tapeline machine pushes (while melting simultaneously) the polypropylene resin into a flat die to produce a flat film, subsequently the flat film is slit into tapes and then the tapes are stretched and wound to make bobbins of the flat tape. Secondly, these tapes are placed in a loom where they are weaved in order to make the fabric. In an embodiment, the woven polypropylene fabric is weaved in such a way to attain a weight from 55 to 200 grams/m$^2$ depending upon the diameter and resistance properties desired of the irrigation device. The difference with the manufacturing of sacks here is that if a tape breaks in the weaving process and an open space or weaving defect remains, it is patched with a particular polypropylene or polyethylene adhesive film by the loom operator, otherwise once the multi-layer structure goes through the next step the heat will enter through the weave defect and cause a perforation in the inner laminate.

Adherence Process: Prior to adherence, while the tapes are being weaved in the loom to make the fabric, the circular polyethylene film is introduced internally through the bottom of the loom into the fabric. Therefore, the loom output is a woven polypropylene fabric with a polyethylene circular film inside in a loose manner.

Figure 2:
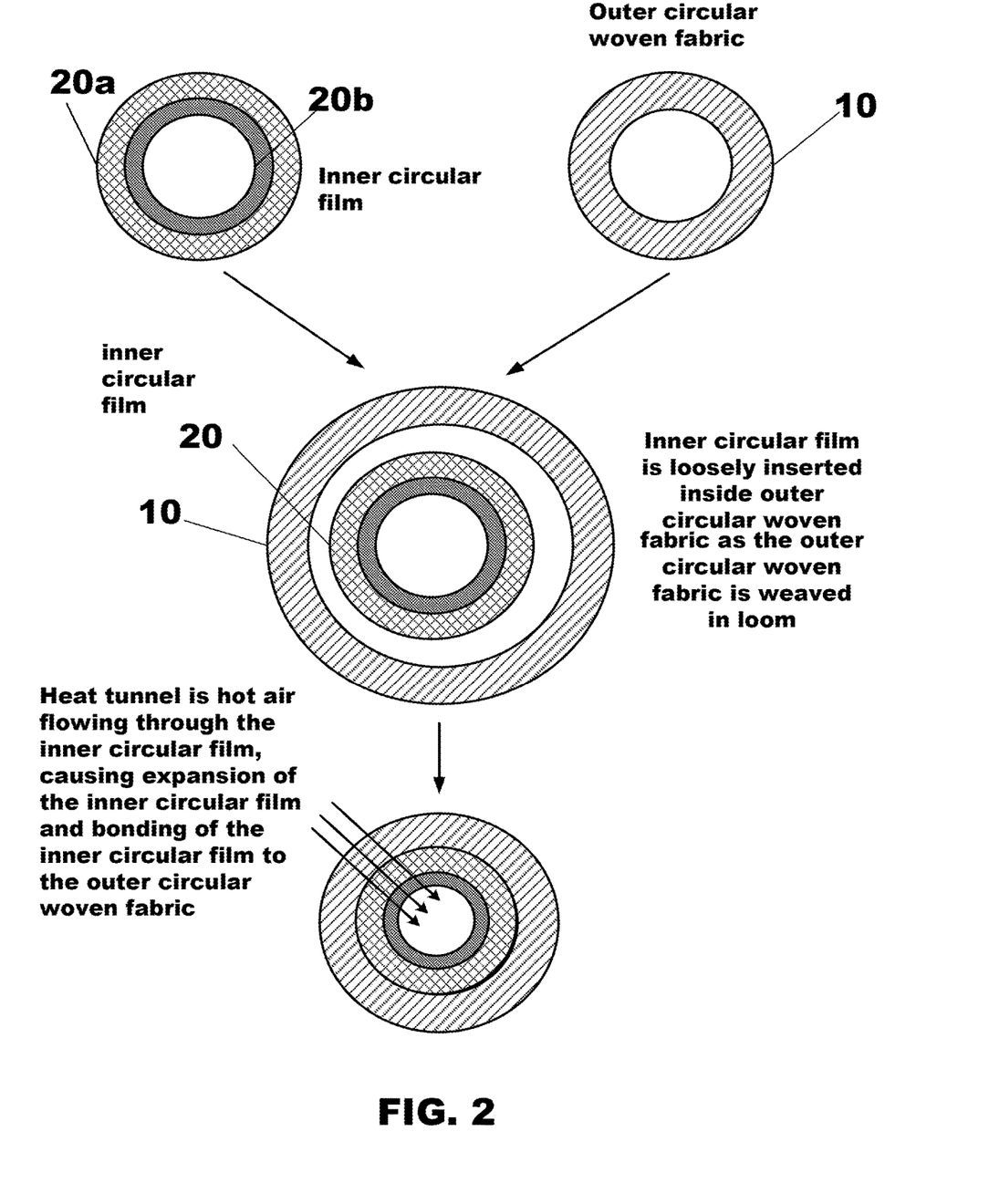
FIG. 2 schematically shows an embodiment of the tubular irrigation device of the present disclosure wherein a circular inner film is bonded to an outer circular fabric by heat.

In an embodiment of the adherence process, referring to FIG. 2, the output of the loom, a circular woven fabric (10) (e.g., polypropylene or polyethylene) with the inner circular film (20) inside, wherein the inner circular film is a multi-layer film comprising an inner polymeric layer (20b) (e.g., polyethylene) and an outer thermoplastic layer (20a) (e.g., EVA), is fed through a hot tunnel at a speed between 20 and 35 meters per minute. The hot tunnel is a cylindrical tunnel which reaches temperatures above 150° C. attained through circulating hot oil or circulated hot air generated by electrical resistances. Before the fabric enters the tunnel, the operator inserts compressed air through an air gun (causing the pin holes), this air makes the fabric (10) inflate and expand since the inner circular film holds the air inside. It is important that the portion of the multi-layer fabric with pinholes should be cull-out always, otherwise 100% waterproofness of the entire length of the irrigation device is not guaranteed. Once the fabric goes through the tunnel the air inside the inner circular film (20) heats up causing: 1) expansion of the inner circular film (20) pushing it against the fabric (10); and 2) bonding of the inner circular film to the outer circular woven fabric due to properties of the thermoplastic outer layer (20a) a low melting point and which allows for sufficient melting to make the inner circular film stick to the fabric. Finally, the tubular irrigation pipe comes out from the hot air tunnel in a roll format.

Figure 3:
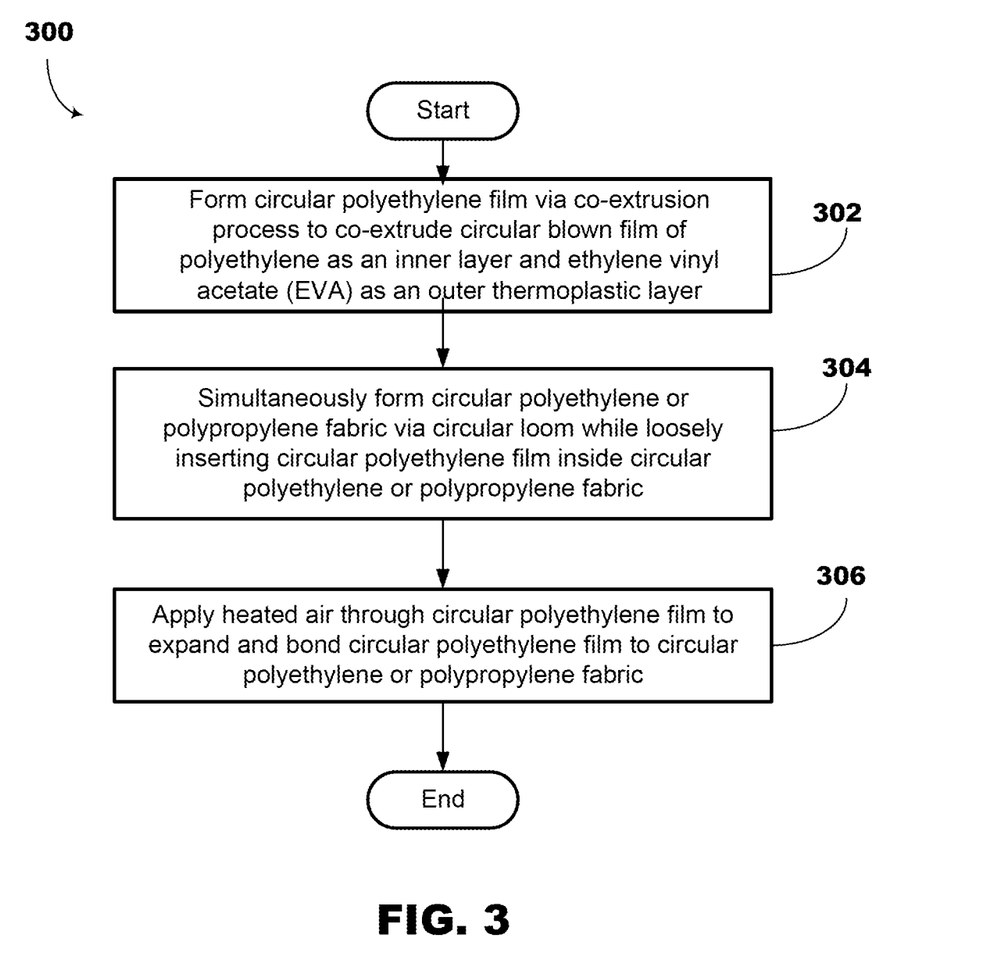
FIG. 3 illustrates a flow diagram for making an embodiment of the tubular irrigation device of the present disclosure wherein a circular inner film is bonded to a circular outer fabric.

In accordance with an embodiment, FIG. 3 illustrates a flowchart of the process of bonding a circular inner film to a circular external fabric 300, beginning at illustrated process block 302 forming circular polyethylene via a co-extrusion process to co-extrude circular blown film of polyethylene as an inner layer and an ethylene vinyl (EVA) as an outer thermoplastic layer. The process proceeds to illustrated process block 304 simultaneously forming circular polyethylene or polypropylene fabric via circular loom while loosely inserting circular polyethylene film inside the circular polyethylene or polypropylene fabric. The process further proceeds as shown in illustrated process block 306 where heat is applied through circular polyethylene film to expand and bond the circular polyethylene film to the circular polyethylene or polypropylene fabric. The process can terminate or end after completion of illustrated process block 306.

Manufacturing Process II—Flat Inner Film Coated to Circular Outer Fabric

Blown Film Process: In one embodiment, flat film bobbins are made out of one or more than one polymeric layers in a blown film polyethylene co-extrusion line or a flat film polypropylene co-extrusion line. See, e.g., FIG. 4 and FIG. 5. Depending on the diameter and strength of the irrigation device, the film would oscillate between 25 and 70 grams/m$^2$ and a width between 20 cm and 2 meters. Once again, any pinhole should be culled out and the film length per bobbin should be such to match with the length of the woven fabric to which it will subsequently laminated.

Woven Fabric Process: In an embodiment, polyethylene or polypropylene circular fabric is weaved using a tapeline extruder and circular looms. The circular fabric is weaved to a predetermined diameter, such as for example, from 5 inches to 50 inches and weight from 50 to 200 grams/m².

Lamination Process: In an embodiment, the flat film bobbin is coated or adhered to the outside of the circular fabric in an extrusion coating machine. The product is a three-layered product, having the circular fabric as the inner layer, the extrusion coating as a middle layer, and the flat film as the outer layer. The weight of the middle layer ranges from 15 to 35 g/m² and enables bonding between the flat film and the circular fabric. In addition, care is undertaken in order to make sure excellent bonding in the flaps occurs. For example, flaps are made wider and not slit in order to increase the bonding area and strength. Further, the position of the flaps in the irrigation device is marked with two color warp tapes in the fabric, in order for the farmer to know where not to punch a hole.

Figure 4:
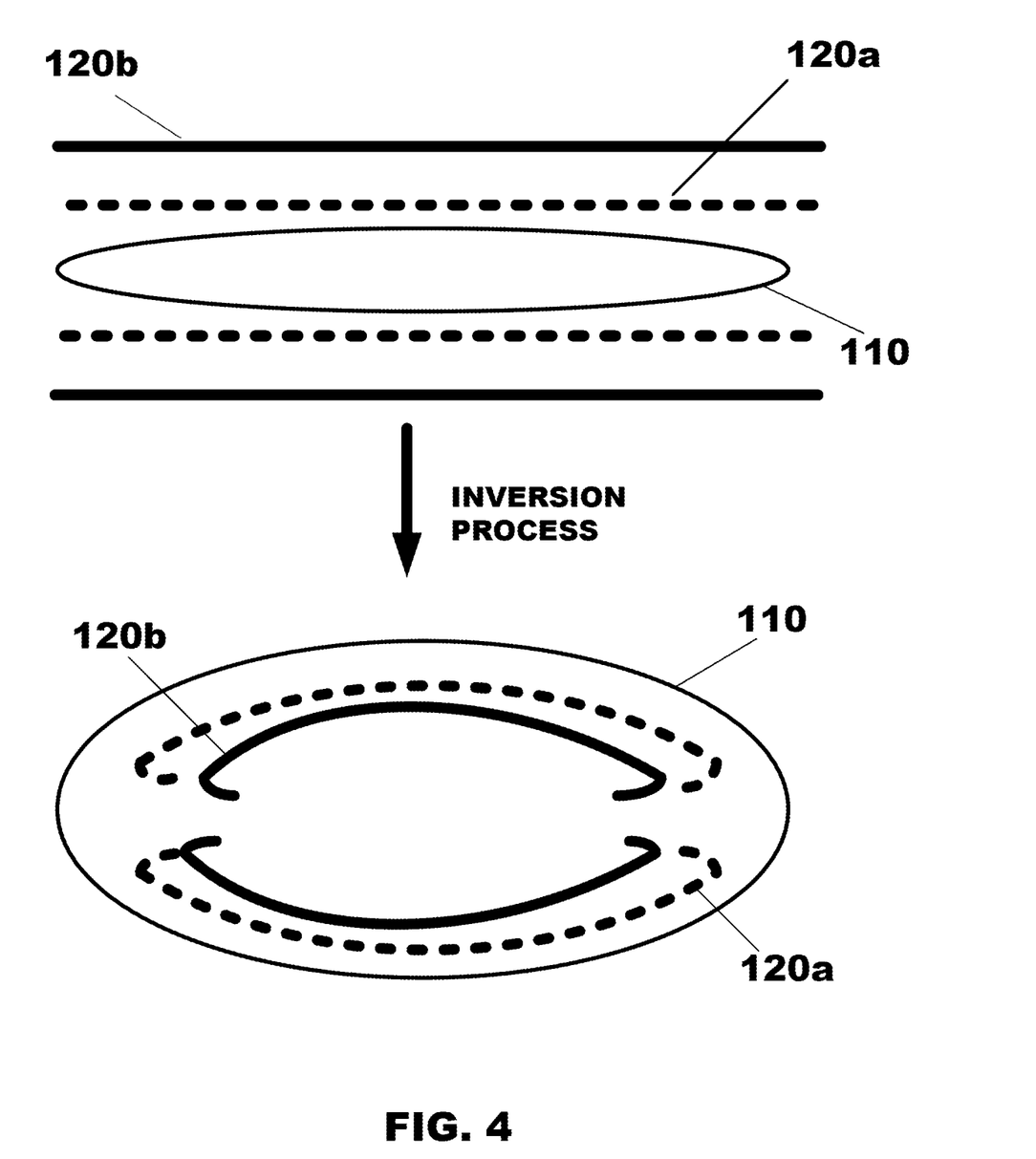
FIG. 4 schematically shows an embodiment of the tubular irrigation device of the present disclosure wherein a flat inner film is adhered to a circular outer fabric by extrusion coating and subsequently inverted inside-out.

Inversion Process: Referring to FIG. 4, in an embodiment, the roll that comes out of the extrusion coating machine is unwound to the predetermined length of the irrigation device and it is then inverted in an inversion machine in order to position the flat multilayer polymeric film such that the thermoplastic layer (120a) is positioned between the inner layer (120b) and the outermost layer 110. Although used in sack manufacturing, particular refurbishments and different materials were used in the sensible areas of the inversion machine in order to assure the fabric and the inner laminate do not suffer any damage due to friction, heat, and/or sharp edges of the moving parts of the machine due to wear.

Figure 5:
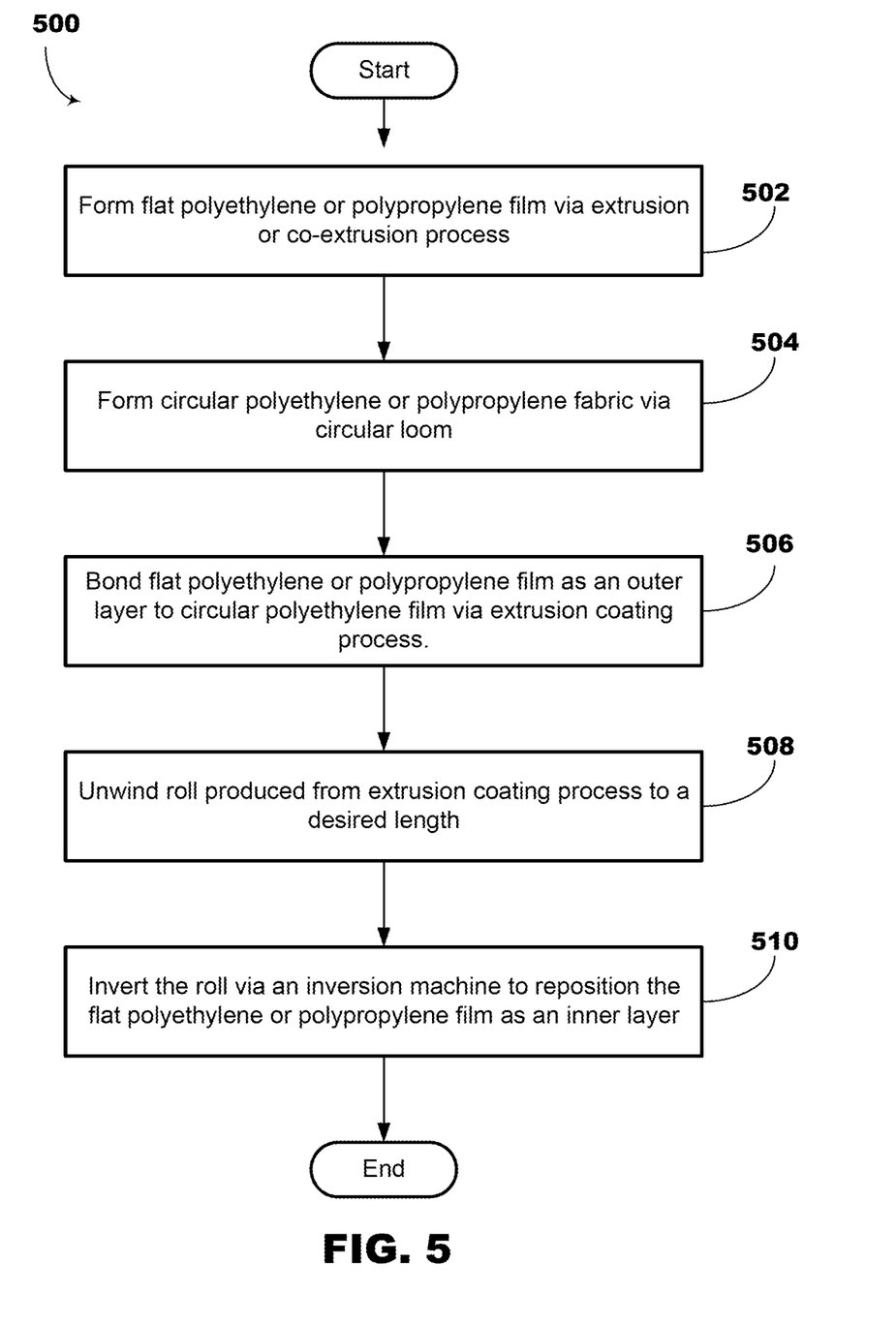
FIG. 5 illustrates a flow diagram for making an embodiment of the tubular irrigation device of the present disclosure wherein a flat inner film is adhered to a circular outer fabric by extrusion coating and subsequently inverted inside-out.

In accordance with an embodiment, FIG. 5 illustrates a flowchart of the process for bonding the flat inner film to the circular outer film 500, beginning at illustrated process block 502 forming flat polyethylene or polypropylene film via an extrusion or co-extrusion process. The process proceeds to illustrated process block 504 forming circular polyethylene or polypropylene fabric via circular loom. The process further proceeds as shown in illustrated process block 506 bonding flat polyethylene or polypropylene film as an outer layer to the circular polyethylene film via an extrusion coating process. The process then proceeds to illustrated process block 508 unwinding the roll produced from an extrusion coating process to a predetermined length. Proceeding to illustrated process block 510 the roll is inverted in an inversion machine to reposition the flat polyethylene or polypropylene film as an inner layer. The process can terminate or end after completion of illustrated process block 510.

In the manufacturing processes of the irrigation device of the present disclosure precautions are taken and methodologies are implemented in order to assure 100% waterproofness along the entire length of the tubular irrigation device produced and to inevitably prevent pin holes and perforations.

Roll Installation by End-User

The tubular flexible irrigation device may be shipped to the end user in a roll format of the predetermined linear length, rolls are packed in a box and stacked in a pallet. The farmer (end-user) will set a roll in a device mounted to the tractor that aids the unrolling of the pipe as the tractor moves forward. Once the pipe is laid, it is connected to a well on one side of the roll, the other the end of the roll is tied in order to avoid water exiting. As the water pressure starts to build up, the farmer manually punches holes of different diameters approximately every 3 feet depending on the desired output making this a custom made irrigation device depending upon the crop been grown (soybean, corn, rice, among others), the soil permeability, farm dimensions and altitude variations. Thanks to the superior length of this irrigation device, real life studies show that farmers save approximately 50% of their time when using this irrigation device instead of the actual in the market.

Testing

Tubular irrigation devices of the present disclosure comprising a multilayer polymeric sheet comprising an outer layer of woven polypropylene and an inner layer comprising an inner laminate film having an adhesive layer and a waterproof layer were subjected to tensile strength tests as shown in Table 1 in comparison to a tubular irrigation device formed by a 100% polyethylene film.

TABLE 1

Mechanical Resistance of Tubular Irrigation Devices.

| | 15' diameter pipe | | | |
|---|---|---|---|---|
| | Water Pressure | | Grab Tensile Strength | |
| | | | Horizontal | Vertical |
| | Head (feet) | PSI | (Weft) | (Warp) |
| Woven multilayer | 12 | 5.2 | 1370 Newton | 1566 Newton |
| Blown film | 3 | 1.3 | 146 Newton | 147 Newton |

*average numbers

The tubular irrigation device formed by a multilayer polymeric sheet comprising an outer layer of woven polypropylene and an inner laminate film layer showed superior strength to support higher water pressure. The conventional pipe made of blown PE can resist up to 3 head pressure (3 feet height), whereas the tubular irrigation pipe of the present disclosure allows pressure to build up to 12 head pressure before the pipe blows or burst. As can be seen from table 1 above, the tensile strength of woven multilayer irrigation device of the present disclosure is between 9 and 10 times higher than the current blown film pipe device formed by a 100% polyethylene film available on the market.

The present disclosure is not limited in scope by the embodiments described herein which are intended as illustrations of a few aspects of the disclosure and any modality that is functionally equivalent It is within the scope of this invitation. Various modifications of the configurations, in addition to those shown and described herein will be apparent to those skilled in the art and are intended to fall within the scope of the appended claims. Therefore, a configuration of polymeric layers can be explicitly mentioned herein; however, other combinations are included although they are not explicitly indicated. The term "comprises" and variations thereof, such as are used in the present document, are used synonymously with the term "including" and variations thereof and are "open," non-limiting terms.

What I claim is:

1. A tubular irrigation device comprising a multilayer polymeric sheet, wherein the polymeric sheet comprises an outer layer and an inner layer;
   the outer layer comprises one or more layers of a woven polymeric thermoplastic material selected from polypropylene and polyethylene;
   the inner layer comprises a multilayer polymeric thermoplastic film having at least one adhesive layer and one or more waterproof layers;
   wherein the one or more waterproof layers are selected from a polypropylene or polyethylene film; and
   the adhesive layer comprises one or more layers of a thermoplastic polymeric material selected from a multilayer extruded film of polyethylene and EVA resin, an extruded copolymer blend of polyethylene and polypropylene, and an extruded polyethylene polymer blend.

2. The tubular irrigation device of claim 1, wherein
the one or more layers of woven polymeric thermoplastic materials are the outermost layer of the tubular device;
the one or more waterproof layers of the polymeric thermoplastic film is the innermost layer of the tubular irrigation device; and
the adhesive layer of polymeric thermoplastic film is between the woven polymeric thermoplastic material and the waterproof thermoplastic layer of the polymeric thermoplastic film and adheres the inner multilayer thermoplastic film to the outer woven polymeric layer.

3. The tubular irrigation device of claim 1, wherein the adhesive layer comprises a multilayer extruded film of polyethylene and EVA resin.

4. The tubular irrigation device of claim 1, wherein the adhesive layer comprises a copolymer blend of polyethylene and polypropylene.

5. The tubular irrigation device of claim 1, wherein the adhesive layer comprises an extruded polyethylene polymer.

6. The tubular irrigation device according to claim 1, wherein the one or more layers of woven polymeric thermoplastic materials have a basis weight of 50-200 g/m$^2$.

7. The tubular irrigation device or tube according to claim 1, wherein the one or more layers of thermoplastic polymeric materials that comprise the adhesive layer have a basis weight of 15 to 35 g/m$^2$.

8. The tubular irrigation device according to claim 1, wherein the one or more layers of polymeric waterproofing materials has a basis weight of 25 to 70 g/m$^2$.

9. The tubular irrigation device according to claim 1, wherein
the one or more layers of woven polymeric thermoplastic materials have a basis weight of from 50 to 200 gr/m$^2$;
the one or more layers of thermoplastic polymeric materials that comprise the adhesive layer have a basis weight of from 15 to 35 gr/m$^2$; and
the one or more layers of polymeric waterproofing materials have a basis weight from 25 to 70 g/m$^2$.

10. The tubular irrigation device according to claim 1, having a tubular body with a diameter of from 5 inches to 50 inches.

11. The tubular irrigation device according to claim 1, wherein said device further contains an ultraviolet (UV) radiation protection additive.

12. The tubular irrigation device according to claim 1, wherein said irrigation device has a 100% waterproof property along its entire length.

* * * * *